United States Patent [19]
Allen

[11] 3,833,914
[45] Sept. 3, 1974

[54] FOLDING CAMERA
[75] Inventor: Joseph H. Allen, Needham, Mass.
[73] Assignee: Polaroid Corporation, Cambridge, Mass.
[22] Filed: Oct. 19, 1972
[21] Appl. No.: 298,872

[52] U.S. Cl. ................................. 354/188, 354/194
[51] Int. Cl. .......................................... G03b 19/12
[58] Field of Search ........ 95/39, 42, 40, 47; 350/60; 160/132

[56] References Cited
UNITED STATES PATENTS
1,159,733  11/1915  Akeley .................................. 95/42
2,127,062  8/1938  Kitching ............................. 160/132
2,811,458  10/1957  Suyak .................................. 160/132
3,190,345  6/1965  Rothwell ............................. 160/132

Primary Examiner—John M. Horan
Attorney, Agent, or Firm—John S. Vale

[57] ABSTRACT

An improved, compact, folding, single lens reflex camera of the self-developing type. The camera is provided with an improved viewing device light shield or shade which is formed by a plurality of U-shaped blades. The blades have integrally formed interlocking tabs and notches which facilitate movement of the blades between collapsed and deployed positions in response to moving a viewing device cover between folded and extended positions.

12 Claims, 5 Drawing Figures

FOLDING CAMERA

BACKGROUND OF THE INVENTION

The present invention relates to photography and, more particularly, to improvements in a compact, folding, single lens reflex camera of the self-developing type.

In the copending patent applications, Ser. No. 141,554 filed on May 10, 1971 by Peter F. Costa et al; and Ser. No. 245,967 filed on Apr. 20, 1972 by Joseph H. Allen et al (now U.S. Pat. No. 3,783,760); a compact, folding, single lens reflex camera of the self-developing type is described which features a folding reflex viewing device.

The camera comprises a plurality of housing sections, including first and second housing sections, which are pivotally interconnected for movement between folded and extended positions. The viewing device is mounted on the first housing section and includes two pivotally mounted optical elements (a curved mirror and magnifying eye lens), appropriate erecting structure for moving the elements between their respective folded and extended position, and a collapsible shade for reducing ambient illumination in the optical path between the two optical elements.

The viewing device erecting structure includes a plurality of linkage arms and a viewing device cover which is pivotally coupled at one end to the first housing section for movement between a folded position, wherein the cover is disposed in overlying relationship to the first housing section, and an extended position wherein the free opposite end of the cover is spaced from the first housing section to locate the curved mirror in its erected position.

The collapsible shade is configured to enclose a major portion of the space between the extended cover and the first housing section and serves to increase the apaprent brightness of an image formed between the two optical elements.

In the preferred embodiment disclosed in copending application Ser. No. 245,967 (now U.S. Pat. No. 3,783,760), the optical elements, erecting structure, and shade are so interconnected that a portion of the erecting structure is adapted to cooperate with the second housing section for automatically moving the viewing device between its folded and extended position in response to moving the first and second housing sections between their respective folded and extended positions.

In both of the previously mentioned copending applications, the collapsible shade is formed by a plurality (four) of generally U-shaped, thin blades. The shape of the blades may be more accurately described as three sides (two elongated sides and a shorter side joined to elongated sides at one end) of an elongated rectangle. The blades are pivotally coupled together at their respective opposite ends (near the open end of the rectangle) and are dimensioned for movement between a collapsed position wherein the blades assume a nesting or telescoping relationship and a deployed or erected position wherein the blades are disposed in side-by-side overlapping relationship to form a three-sided shade or light shield.

The pivotally coupled opposite ends of the blades are pivotally connected to the first housing section at the same pivot point at which the one end of viewing device cover is pivotally coupled thereto. When the cover is in its folded position (overlying the first housing section) the blades assume their collapsed nesting relation in a space between the inside of the cover and the exterior surface of the first housing section.

The innermost of the nesting blades is preferably secured to the first housing section. The outermost blade may be spring biased upwardly or secured to the free opposite end of the cover. As the cover is raised (pivoted) to its extended position, the blades are adapted to be sequentially pivoted, outermost blade first, about their opposite ends for movement to their deployed positions to form the shade.

In order to achieve the sequential deployment of the blades, the outermost blade is provided with a flange at the closed leading end of the U which is adapted to engage and interlock with a corresponding flange on the next adjacent second blade. The second blade, in turn, includes another flange at its leading end which engages and interlocks with a corresponding flange at the leading end of the next adjacent third blade. The third blade also includes another leading end flange which interlocks with a flange on the leading end of the innermost fourth blade which is secured to the first housing section.

The interlocking flanges at the leading ends of the four blades serve as stops to fix the position of the uppermost three blades in relation to the fixed fourth blade.

As the cover is closed, the flanges disengage such that the blades may assume their collapsed nesting relation in response to moving the viewing device cover from its extended to its folded position.

While this type of shade functions very well, it has the major disadvantage of being very expensive to manufacture.

In order to achieve the desired camera compactness, the blades are preferably formed from a thin (0.006 inch to 0.009 inch) strip of stainless steel. The length of each successive blade from the outermost to the innermost is reduced to permit them to assume the nesting relationship.

Typically, the length of a blade from the leading closed end of the U to the pivot points at the open trailing end of the U is 3.460 inches for the outermost blade and 3.437, 3.414, 3.391 inches for the next three blades, respectively.

The spacing between the nexting leading ends of blades is 0.023 of an inch. Thus, the interlocking flanges at the leading ends of the blades must be located at very precise distances from the blade pivot points to insure that the shade will be properly deployed and collapsed.

One skilled in the art will appreciate the exacting manufacturing tolerance and expense required to form such flanges on the thin blades and accurately hold their dimensions over the typical balde length of approximately 3.4 inches.

SUMMARY OF THE INVENTION

The present invention provides an improved lower cost, collapsible shade for a folding viewing device particularly adapted for use with a compact, folding, single lens reflex camera of the self-developing type.

The collapsible shade is formed by four (4) generally U-shaped, thin, metal blades which are pivotally connected near their respective opposite trailing ends for movement between a collpased nesting position and a deployed side-by-side overlapping position to form a three-sided light shield between the viewing device cover and the camera's first housing section.

The innermost of the nesting blades is adapted to be secured to the first housing section and the outermost blade is adapted to be secured to the free end of the pivotally mounted viewing device cover.

The blades are provided with two sets of interlocking tabs and notches near the blade pivot points which serve to interconnect the blades for sequential movement between their respective collapsed and deployed position and also function as positioning stops.

The major advantage of interlocking tab and notch system is that they are located close to the blade pivot points and their dimensions and location are far less critical than the previously employed interlocking flanges at the leading ends of the blades. As such, the manufacturing cost is reduced significantly. Furthermore, the tabs and notches are, advantageously, at least partially enclosed by a portion of the viewing device cover such that they are not apt to be inadvertently disengaged from one another by the user as he handles the viewing device to fold or extend the camera.

Therefore, it is an object of the invention to provide an improved collapsible shade for a folding viewing device associated with such a camera.

Another object is to provide an improved compact, folding, single lens reflex camera of the self-developing type.

It is yet another object of the present invention to provide a low cost collapsible shade for a folding viewing device.

Other objects of the invention will, in part, be obvious and will, in part, appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
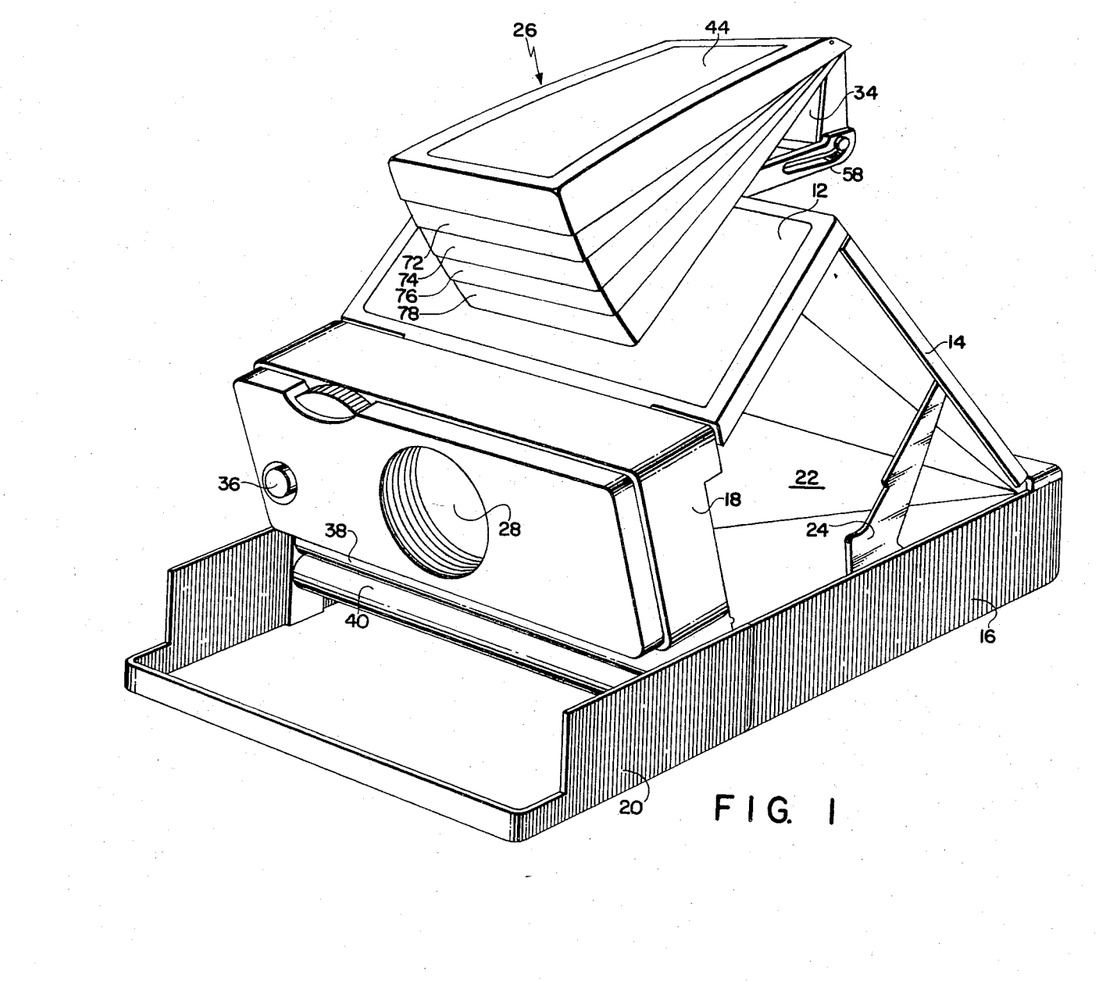
FIG. 1 is a perspective view of an improved, compact, folding, single lens reflex camera of the self-developing type embodying the instant invention shown in its extended operative position.
Figure 3:
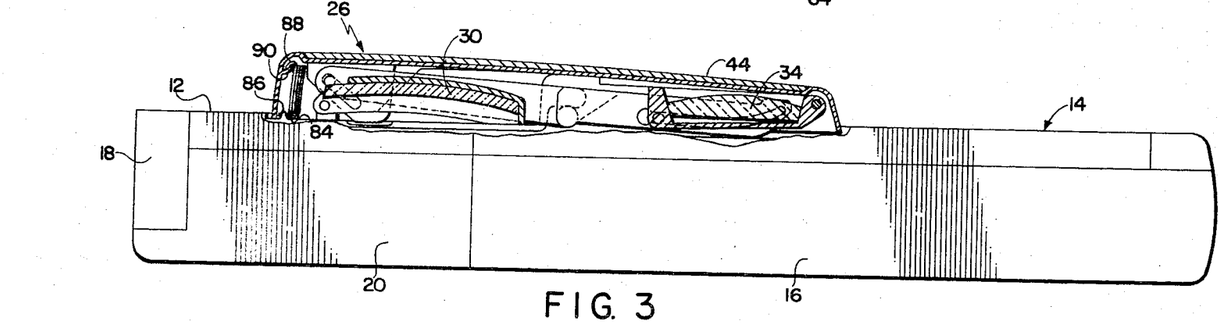
FIG. 3 is an elevational view, partly in section, of the camera of FIG. 1 shown in its folded position.

A compact, folding, single lens reflex camera 10 of the self-developing type is shown in its extended operative position in FIG. 1 and its folded inoperative position in FIG. 3.

Camera 10 includes a plurality of pivotally interconnected housing sections 12, 14, 16, 18, and 20. Sections 12, 14, 16, and 18 are pivotally coupled together at their opposite ends to form a four bar linkage for facilitating movement between the folded and extended position. Section 20 extends forwardly of housing section 16 and is adapted to be pivoted downwardly (as viewed in FIG. 1) to permit loading of a film pack into a receiving chamber in housing section 16.

Camera 10 is provided with an opaque flexible bellows or envelope 22 which encloses and renders lighttight the space between the extended housing sections 12, 14, 16, and 18. Also an erecting link 24 is provided between housing sections 14 and 16 for releasably locking the camera in its extended position.

Mounted on housing section 12 is a folding viewing device 26 which will be described in detail hereinafter.

Since the structural details and mode of camera operation are fully described in the two previously mentioned copending applications, and the subject matter of the present invention is specifically related to the construction and operation of the viewing device 26, only a relatively brief description of camera 10 will be provided.

A film assemblage (not shown) comprising a film container and a plurality of self-developing film units arranged in stacked relation therein are inserted into a receiving chamber in housing section 16. The film units are preferably of the type described in U.S. Pat. No. 3,415,644, granted to E. H. Land on Dec. 10, 1968 and assigned to the same assignee as the present invention.

The forwardmost film unit in the container is positioned at the camera's exposure plane in position to be exposed to image forming light which enters camera 10 through an objective lens 28 mounted on housing section 18. From lens 28 the light travels across the space between housing sections 18 and 14 and impinges a mirror mounted on the interior surface of section 14 from where it is reflected downwardly and through exposure apertures in housing section 16 and the film container to expose the forwardmost film unit.

Prior to the film exposure mode of operation, the camera 10 is adapted to operate in a viewing and focusing mode. A plate-like reflex member is pivotally coupled to housing section 16 near its pivotal connection with housing section 14 for movement between a focusing position in which the reflex member overlies the exposure aperture in housing section 16 (thus light shielding the forwardmost film unit) and an exposure position in which it is pivoted upwardly such that it overlies the fixed mirror mounted on housing section 14.

The reflex member includes a reflective focusing screen on one side (facing housing sections 12 and 14) and a reflective surface on the opposite side (facing the forwardmost film unit).

With the reflex member in its down or focusing position, light from the lens 28 is directed on to the focusing screen (via reflection from the mirror on housing section 14) to form an image of the scene to be photographed.

Light emanating from the image is directed to a preselected portion of the mirror on housing section 14 from where it is directed towards a viewing device entrance pupil positioned adjacent to housing section 12. After passing through the entrance pupil and an aligned opening in housing section 12, the light impinges on a curved mirror 30 (see FIG. 2) forming part of the viewing device 26. Mirror 30 reflects the light rearwardly and forms a second image of the scene (within the confines of the viewing device) which may be viewed through a magnifying eye lens 34 (see FIG. 1) at the trailing end of the viewing device 26.

After adjusting the objective lens 28 to bring the image into sharp focus, a camera start button 36 on housing section 18 is depressed to initiate a cycle of camera operation.

In operation the camera is automatically reconfigured from its viewing mode to its exposure mode. A normally open shutter behind lens 28 is closed and the reflex member is pivoted upwardly to its exposure position. The shutter is opened and the light is reflected from the reflective surface on the underside of the reflex member through the exposure apertures to expose the forwardmost film unit. After an appropriate exposure interval, the shutter is closed and the reflex member is pivoted downwardly to the viewing position and the shutter is again reopened.

As the reflex member is pivoted downwardly to the viewing position, a film advance mechanism engages and advances the forwardmost film unit through withdrawal slot in the film container and into engagement with a pair of opposed cylindrical rollers 38 and 40 mounted on housing section 20. At least one of the rollers is driven in a direction to cause the engaged film unit to be driven therebetween towards the exterior of camera 10. Each film unit, as described in U.S. Pat. No. 3,415,644, includes a self-contained rupturable container of fluid processing composition. As the film units pass between the rollers, they apply a compressive pressure to the film unit which causes the fluid to be dispensed and distributed between predetermined photosensitive and image-receiving layers to initiate a well known diffusion transfer process.

As noted earlier, the folding viewing device 26 is mounted on the first camera housing section 12 for movement between its folded and extended positions.

Figure 5:
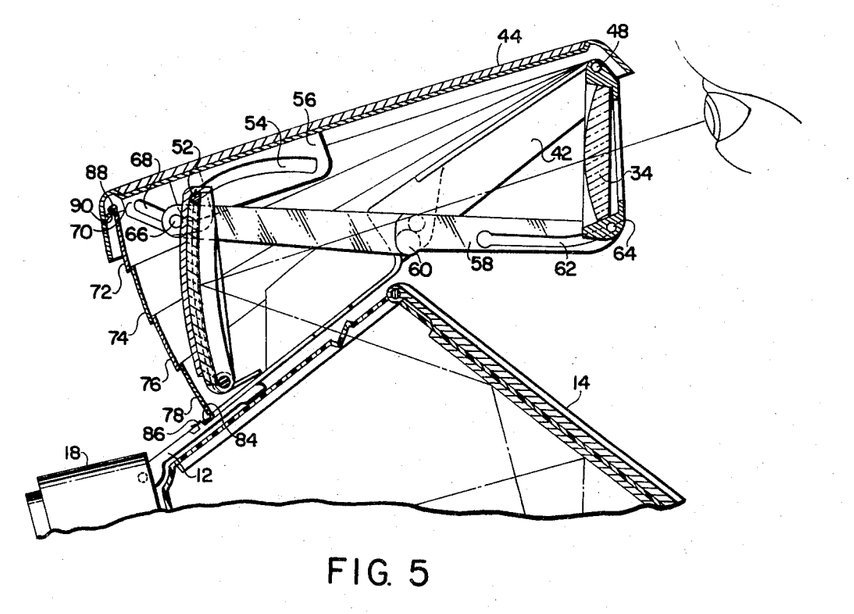
FIG. 5 is an elevational view, partly in section, ov the camera's viewing device in an operative position.

As best shown in FIG. 5, housing section 12 includes a pair of spaced rearwardly extending arms 42 (only one of which is shown) for supporting the eye lens 34, the trailing end of a viewing device cover 44, and the trailing end of a collapsible viewing device shade 46. It will be noted that cover 44, eye lens 34, and shade 46 are all pivotally coupled to the trailing ends of arms 42 at a common pivot point 48.

The curved mirror 30 is pivotally coupled at its lower end to the forward portion of housing section 12 at pivot point 50. A pair of outwardly extending pins 52 at the top end of mirror 30 are adapted to ride in arcuate slots 54 formed in a pair of laterally spaced flanges 56 which depend from the interior surface of viewing device cover 44.

A pair of laterally spaced erecting links 58 are pivotally coupled near their midpoints to housing section 12 at pivot points 60 and include elongated slots 62 near their trailing ends for receiving a pair of pins 64 extending outwardly from the lower end of eye lens 34. The leading ends of links 58 include pins 66 which ride in a pair of angled slots 68 formed in a pair of laterally spaced flanges 70 depending from the interior of viewing device cover 44.

It will be noted that both the eye lens 34 and the curved mirror 30 are spring biased towards their respective erected positions. Thus their pins 52 and 64 are held against the ends of slots 54 and 62 respectively to hold the two optical elements in their respective erected positions.

It will be noted that if the free end of cover 44 is pivoted in a counterclockwise direction (as viewed in FIG. 5) about pivot point 48, the upper end of the curved mirror will follow slot 54 and pivot in a clockwise direction about pivot point 50 to assume its folded position (see FIG. 3) in overlying relation to the forward portion of housing section 12.

The counterclockwise rotation of cover 44 also causes link 58 to pivot in a counterclockwise direction about its midpoint pivot 60 which in turn results in the eye lens 34 pivoting in a clockwise direction about its pivot point 48 to assume its folded position in underlying relation to the rearwardly extending arms 42.

The viewing device 26 may be folded by pressing down on the leading end of cover 44 as just described or alternatively, and preferably, by moving the first, second, and fourth housing sections 12, 14, and 18 to their folded positions by releasing link 24 and pressing downwardly on the second housing section 14. As the camera approaches its folded position, the trailing ends of viewing device links 58 engage the exterior surface of housing section 14. Further movement of the housing sections toward the folded position causes housing section 14 to pivot link 58 in a counterclockwise direction about its midpoint pivot 60 resulting in the viewing device 26 being moved to its folded position as previously described and more fully explained in earlier noted copending application Ser. No. 245,967.

Figure 4:
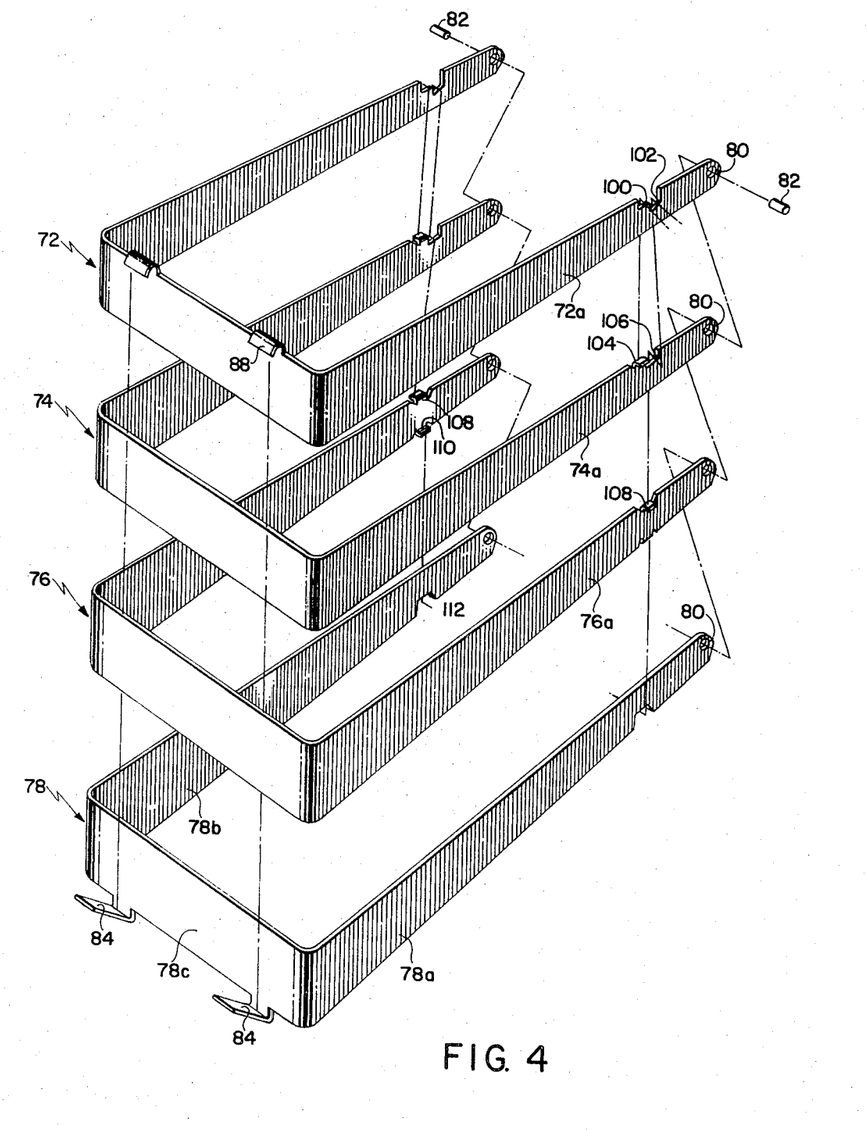
FIG. 4 is an exploded perspective view of four U-shaped blades which form the improved viewing device shade in accordance with this invention.

As best shown in FIG. 4, the collapsible shade 46 for enclosing the space between housing section 12 and the extended viewing device cover 44 is preferably formed by a plurality (four) of the generally U-shaped blades 72, 74, 76, and 78. For the sake of clarity each blade will be designated as including elongated side sections a and b and a leading end section c. Thus when blade 72 is referred to hereinafter, its sections will be designated as side sections 72a and 72b and leading end section 72c.

In a preferred embodiment, the blades are formed from a thin (approximately 0.007 inch) strip of stainless steel and the dimensions of the blades in terms of length and width are progressively smaller with blade 72 being the largest and blade 78 being the smallest such that the four blades may assume a compact nesting relation (see FIG. 3).

Figure 2:
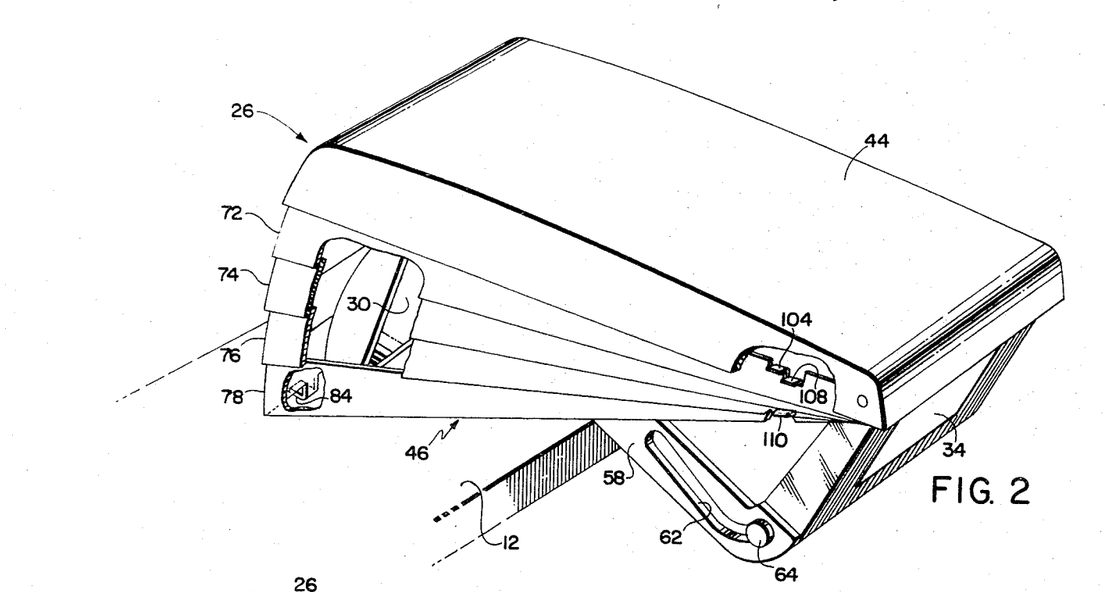
FIG. 2 is a perspective view, partly in section, of the camera's viewing device showing the details of an improved viewing device shade in its deployed position.

The blades 72, 74, 76 and 78 are adapted to be pivotally interconnected at their opposite ends, i.e., at the trailing ends of side sections a and b for movement between the nesting position shown in FIG. 3 and the extended or deployed position of FIGS. 1 and 2.

In a preferred embodiment, the trailing ends of the blade sections a and b are provided with holes 80 through which pins 82 may be inserted to pivotally interconnect the blades. Alteratively, a pair of hollow rivets may be employed to accomplish the same function.

Typically, the lengths of blades 72, 74, 76 and 78 measured from leading end section c to the holes 80 are 3.460 inch, 3.437 inch, 3.414 inch, and 3.391 inch. The widths of the blades as measured at the leading end c between the exterior surfaces of sections a and b are 2.031 inch, 2.011 inch, 1.991 inch, and 1.971 inch, respectively. Thus the blades are dimensioned to be progressively shorter by 0.023 of an inch and narrower by 0.020 of an inch.

As best shown in FIG. 1, the blades 72, 74, 76 and 78 are adapted to be pivotally coupled at holes 80 to the trailing end of the rearwardly extending arms 42 on housing section 12 along with the trailing end of viewing device cover 44 and eye lens 34.

The lowermost blade 78 is adapted to be secured to the first housing section 12, preferably by a pair of integrally formed tabs 84 which extend forwardly of the lower edge of leading end section 78c. As best shown in FIG. 3, housing section 12 is provided with a pair of upstanding flanges 86 which have slots therethrough for receiving tabs 84.

The lowermost blade 78 being the smallest of the four blades is also the innermost blade when the blades assume their nesting relation. The uppermost blade 72 is the outermost blade and is adapted to be secured to the viewing device cover 44. As best shown in FIGS. 3 and 4, blade 72 includes a pair of integrally formed hook-shaped tabs 88 extending forwardly of the upper edge of its leading end section 72c which are adapted to engage an inwardly extending flange 90 formed on the interior of the leading end wall of viewing device cover 44.

As the cover 44 is moved from its folded position overlying housing section 12, to its extended position wherein the leading end of cover 44 is spaced from the forward portion of housing section 12, the shade 46 (formed by blades 72, 74, 76 and 78 is adapted to move from the nesting or collapsed position of FIG. 3 to the deployed position of FIGS. 1 and 2 wherein the blades 72, 74, 76 and 78 are disposed in side-by-side overlapping relation to form a three-sided light shield for enclosing the space between cover 44 and housing section 12.

In order that the blades may be sequentially erected or deployed, means are provided near the pivotally coupled opposite ends of the blades for interconnecting the blades for sequential movement and for fixing their deployed positions.

The interconnecting and stop means include a plurality of interlocking tabs and notches formed in the blades 72, 74, 76 and 78 near the trailing ends of side sections a and b.

The tabs and notches on sections a and b are identical and all description pertaining to the tabs and notches on blade section a will apply to those formed on blade section b.

As best shown in FIG. 4, blade section 72a includes a shallow notch 100 and a deeper adjacent notch 102 in its upper edge.

The shallow notch 100 is aligned with an outwardly turned tab 104 on the next adjacent blade side section 74a. When the blades are located in their nesting position, the tab 104 is positioned over, but is spaced from, the bottom of notch 100. As the leading end of cover 44 is pivoted upwardly (clockwise) as shown in FIG. 3, the outermost blade 72 moves with it. When blade 72 is positioned in its proper side-by-side overlapping relation with the next adjacent blade 74, the bottom of notch 100 engages the underside of tab 104 thereby interconnecting the two blades. As the cover 44 is raised further, blade 72 carries the deployed blade 74 with it.

It will be noted that blade section 74a also includes a shallow notch 106 next to tab 104. Notch 106 is positioned in alignment with the deeper slot 102 on blade section 72a and is dimensioned such that its bottom edge coincides with the bottom edge of notch 102 when blades 72 and 74 assume their deployed relation. As blades 72 and 74 are further raised, blade 74 assumes its deployed side-by-side overlapping relation with blade 76 and the aligned bottom edges of notches 10 on blade section 72a and 106 on blade section 74a engage an outwardly turned tab 108 formed on the top edge of blade section 76a. Thus the blade 76 is carried upwardly by blades 72 and 74.

In order to limit the upward movement of blades 72, 74, and 76, blade section 76a is provided with an inwardly turned flange 110 along its bottom edge which is aligned with a shallow notch 112 formed in the bottom edge of the fixedly secured blade section 78a. As soon as blade 76 reaches its deployed relation with blade 78, the inwardly turned tab 110 on blade section 76a engages and is stopped by the uppermost edge of notch 112.

When the shade 46 is fully deployed, the edges of the blades 72–78 overlap slightly such that ambient light may not pass therebetween. It will be understood that the function of shade 46 is to reduce the amount of ambient light present in the optical path between mirror 30 and eye lens 34 to increase the apparent brightness of the image formed therebetween.

As the camera is folded, and viewing device cover 44 is pivoted towards housing section 12, the shade 44 is collapsed by reversing the deployment sequence. The upper three blades 72, 74, and 76 move downwardly towards housing section 12 as a unit; the lower edge of blade leading end section 76c rests against and is stopped by the forwardly extending tabs 84 on the leading end blade section 78c. Blades 74 and 72 then move to their collapsed nesting position in a similar manner.

The tab and notch interlocking system has several major advantages over the shade construction utilized in the previously noted copending patent applications. Most important among them is that the blade assembly is much less expensive to manufacture.

Because the tabs and notches are located near the pivot points, the tolerance of their location relative to the pivot points is much easier to hold. In the previous embodiment where the interlocking flanges were located on leading end blade sections c, the size of the flange projection had to be held within 0.001 or 0.002 of an inch over a distance of approximately 3.40 inches from the pivot point. Also, because the spacing between adjacent leading end blade sections c is only 0.023 of an inch, these flanges had to be precisely formed to prevent the blades from binding.

In the present invention, the tabs are located approximately 0.500 of an inch from the pivot points 80. More importantly, the tabs and notches interlock across the blades rather than between the blades, therefore their dimensions are less critical.

Another advantage of the present system is that the depending side walls 114 of viewing device cover 44 enclose most of the interlocking tabs and notches even when cover 44 is in its fully extended position. Thus the possibility of the camera user accidentally disconnecting the blades as he handles the camera is greatly reduced.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A collapsible shade for reducing the amount of ambient illumination in the optical path of a folding viewing device, said shade comprising:
   a plurality of thin U-shaped blades, each of said U-shaped blades including first and second side sections each having leading and trailing ends thereof and a leading end section intermediate said leading ends of said first and second side sections, said plurality of U-shaped blades being pivotally interconnected near their respective trailing ends of said first and second side sections for movement between a collapsed position wherein said blades are disposed in nesting relation to one another and a deployed position wherein said blades are disposed in side-by-side overlapping relation to form a three-sided light shield; and
   means integrally formed with said first and second side sections of said blades near their pivotal interconnection for interconnecting said blades for sequential movement to their respective deployed positions;
   said plurality of blades including first, second, third and fourth blades, said first blade being the outermost in the nesting position and said fourth blade being the innermost blade;
   said first blade including a shallow notch and an adjacent deeper notch, said second blade including an outwardly turned tab adapted to be engaged by the bottom edge of said shallow notch and said second blade further including a shaoow notch adjacent to said tab thereon which is adapted to be aligned with said deeper notch on said first blade when said first and second blades are located in their respective deployed positions, said third blade including an outwardly turned tab which is adapted to be engaged by the aligned bottom edges of said deeper notch on said first blade and by said shallow notch on said second blade, said third blade further including an inwardly turned tab, and said fourth blade including a notch therein which is adapted to be engaged by said inwardly turned tab on said third blade.

2. A shade as defined in claim 1 wherein said first, second, third and fourth blades each include two sets of said interlocking tabs and notches.

3. A collapsible shade for a folding viewing device fo the type including a viewing device cover which is adapted to be pivotally coupled at one end to a camera housing section for movement between a folded position in which said cover is disposed in overlying relation to said housing section and an extended position in which the free opposite end of said cover is adapted to be collapsible from said housing section, said collaspsible shade comprising:
   a plurality of U-shaped blades pivotally connected at their respective opposite ends and configured for movement between a collapsed position wherein said blades are disposed in nesting relation to one another between said housing section and said cover located in its said folded position and a deployed position in which said blades are disposed in side-by-side overlapping relation to one another for enclosing the space between said housing section and said cover located in its said extended position;
   means for securing the outermost of said plurality of blades to said cover and the innermost of said plurality of blades to said housing seciton; and
   means for interconnecting one or more blades intermediate said outermost and innermost blades with said outermost and innermost blades and with one another near said pivotal connections such that said blades may be moved between their respective collapsed and deployed positions in response to moving said cover between its said folded and extended position.

4. A collapsible shade as defined in claim 3 wherein said means for interconnecting said one or more blades intermediate said outermost and innermost blades include a plurality of interlocking tabs and notches intergrally formed with said outermost, innermost, and intermediate blades.

5. A collapsible shade as defined in claim 4 wherein there are two blades intermediate said outermost and innermost blades.

6. A collapsible shade as defined in claim 3 wherein said outermost blade is a first blade, said innermost blade is a fourth blade, and said intermediate blades include second and third blades.

7. A collapsible shade as defined in claim 6 wherein said first blade includes a shallow notch and an adjacent deeper notch, said second blade includes an outwardly turned tab adapted to be engaged by the bottom edge of said shallow notch and said second blade further includes a shallow notch adjacent to said tab thereon that is adapted to be aligned with said deeper notch on said first blade when said first and second blades are located in their respective deployed positions, said third blade including an outwardly turned tab which is adapted to be engaged by the aligned bottom edges of said deeper notch on said first blade and by said shallow notch on said second blade, said third blade further including an inwardly turned tab, and said fourth blade including a notch therein which is adapted to be engaged by said inwardly turned tab on said third blade.

8. A folding single lens reflex camera comprising:
   a plurality of housing sections, including first and second housing sections, pivotally interconnected for movement between folded and extended positions;
   a folding viewing device mounted on said first housing section for movement between folded and extended positions in response to moving said first and second housing sections between their respective folded and extended positions, said viewing device including a cover pivotally coupled at one end to said first housing section for movement between a folded position in which said cover is disposed in overlying relation to said first housing section and an extended position in which the opposite end of said cover is spaced from said first housing section;

a collapsible shade formed by first, second, third and fourth, U-shaped blades interconnected near their respective opposite ends for movement between a collapsed position wherein said blades are disposed in nesting relation between said first housing section and said cover located in its folded position and a deployed position in which said blades are disposed in side-by-side overlapping relation to one another for enclosing the space between said first housing section and said cover located in its extended position;

means securing said first blade to said cover and said fourth blade to said first housing section; and means for interconnecting said first, second, third and fourth blades, near their respective opposite ends such that said blades may be moved between their respective collapsed and deployed positions in response to moving said cover between its folded and extended positions.

9. A camera as defined in claim 8 wherein said means for interconnecting said first, second, third and fourth blades includes a plurality of interlocking tabs and notches integrally formed with said first, second, third and fourth blades.

10. A camera as defined in claim 9 wherein said first, second, third and fourth blades include two sets of said interlocking tabs and notches.

11. A camera as defined in claim 9 wherein said viewing device cover is configured to at least partially enclose said tabs and notches.

12. A camera as defined in claim 9 wherein said tabs are configured to extend across a next adjacent blade and engage a notch therein.

* * * * *